(12) United States Patent
Rong et al.

(10) Patent No.: US 11,651,458 B2
(45) Date of Patent: May 16, 2023

(54) METHOD FOR GENERATING TARGET CONTRACT AND TERMINAL DEVICE

(71) Applicant: Advanced New Technologies Co., Ltd., Grand Cayman (KY)

(72) Inventors: Tao Rong, Zhejiang (CN); Yan Wang, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/191,356

(22) Filed: Mar. 3, 2021

(65) Prior Publication Data

US 2021/0279828 A1    Sep. 9, 2021

Related U.S. Application Data

(63) Continuation of application No. PCT/CN2019/103694, filed on Aug. 30, 2019.

(30) Foreign Application Priority Data

Oct. 31, 2018  (CN) .......................... 201811283461.9

(51) Int. Cl.
 *G06Q 50/18* (2012.01)
 *G06F 40/279* (2020.01)
 *H04L 12/18* (2006.01)

(52) U.S. Cl.
 CPC .......... *G06Q 50/18* (2013.01); *G06F 40/279* (2020.01); *H04L 12/1831* (2013.01)

(58) Field of Classification Search
 None
 See application file for complete search history.

(56) References Cited

U.S. PATENT DOCUMENTS 9,990,504 B1   6/2018  Chapman et al.
10,733,240 B1 * 8/2020  Callahan ................ G06Q 10/10
(Continued)

FOREIGN PATENT DOCUMENTS

CA  3 051 393 A1  1/2018
CN  101075330 A  11/2007
(Continued)

*Primary Examiner* — Howard Cortes
(74) *Attorney, Agent, or Firm* — Seed IP Law Group LLP

(57) ABSTRACT

The present specification discloses a method for generating a target contract and a terminal device. The method includes: generating, based on an operation instruction of a first user, a contract signing request to sign a contract with a second user cluster; sending the contract signing request to a second terminal device cluster corresponding to the second user cluster, for M second terminal devices in the second terminal device cluster to each generate and return, based on the joint contract signing request, a piece of first acknowledgment information that acknowledges jointly signing a contract; determining, based on M pieces of first acknowledgment information, chat information from group chat records in a same chat group as the second user cluster; generating a pending contract based on the chat information, and sending the pending contract to the second terminal device cluster, for P second terminal devices in the second terminal device cluster to each generate a piece of second acknowledgment information that acknowledges the pending contract; and determining the pending contract as a target contract based on P pieces of second acknowledgment information, and uploading the target contract to a blockchain.

22 Claims, 8 Drawing Sheets

(56) References Cited

U.S. PATENT DOCUMENTS

| | | | |
|---|---|---|---|
| 2003/0045009 A1 | 3/2003 | Tanaka et al. | |
| 2016/0247157 A1* | 8/2016 | Yang | |
| 2018/0239959 A1* | 8/2018 | Bui | G06F 40/103 |
| 2019/0043483 A1* | 2/2019 | Chakraborty | G06N 3/0454 |
| 2019/0073729 A1* | 3/2019 | Cheng-Shorland | H04L 9/088 |
| 2019/0081789 A1* | 3/2019 | Madisetti | G06Q 20/401 |
| 2019/0173811 A1* | 6/2019 | Estrada | H04L 51/02 |
| 2019/0245813 A1* | 8/2019 | Tokuchi | H04L 51/063 |
| 2019/0253257 A1 | 8/2019 | Yan | |
| 2019/0370799 A1* | 12/2019 | Vivas | H04L 9/0643 |

FOREIGN PATENT DOCUMENTS

| | | |
|---|---|---|
| CN | 105571638 A | 5/2016 |
| CN | 105787741 A | 7/2016 |
| CN | 105975868 A | 9/2016 |
| CN | 106097109 A | 11/2016 |
| CN | 106339875 A | 1/2017 |
| CN | 106485479 A | 3/2017 |
| CN | 106652999 A | 5/2017 |
| CN | 107451275 A | 12/2017 |
| CN | 107657553 A | 2/2018 |
| CN | 108234443 A | 6/2018 |
| CN | 108430061 A | 8/2018 |
| CN | 108667717 A | 10/2018 |
| CN | 110009333 A | 7/2019 |
| TW | 200915407 A | 4/2009 |
| TW | M563017 U | 7/2018 |
| WO | 2005/091164 A1 | 9/2005 |

\* cited by examiner

METHOD FOR GENERATING TARGET CONTRACT AND TERMINAL DEVICE

BACKGROUND

Technical Field

The present application relates to the Internet field, and in particular, to a method for generating a target contract and a terminal device.

Description of the Related Art

With the development of the Internet, there are more and more operations such as online transactions (transfer of money, red packets, etc.) and online chat. A buyer and a seller can close a transaction online even if they are at different locations.

During the transaction, for example, if the buyer needs to purchase a batch of items, the buyer can directly communicate with the seller by using chatting and payment software, and then transfer money online to the seller; and the seller can directly deliver the items to the buyer. If the buyer and the seller trust each other, the buyer may transfer money directly to the seller, and the seller delivers items directly without communication.

However, in the transaction process, due to lack of contract awareness or insufficient communication, transaction disputes occur. For example, the buyer and the seller may communicate with each other in the real world, but transfer money online. If the purpose of the money is not recorded, and the seller does not recognize the purpose of the money, this can easily cause disputes between the buyer and the seller.

BRIEF SUMMARY

The present specification provides a method for generating a target contract and a terminal device. The techniques have the technical advantages that, among others, alleviate or partially alleviate a dispute generated in a transaction on the Internet.

A method for generating a target contract is provided, where the method includes: generating, based on an operation instruction of a first user, a joint contract signing request to jointly sign a contract with a second user cluster; sending the joint contract signing request to a second terminal device cluster corresponding to the second user cluster, a second user in the second user cluster being one-to-one corresponding to a second terminal device in the second terminal device cluster, for M second terminal devices in the second terminal device cluster to each generate and return, based on the joint contract signing request, a piece of first acknowledgment information that acknowledges jointly signing a contract, M>0 and being a positive integer; determining, based on M pieces of first acknowledgment information, chat information from group chat records in a same chat group as the second user cluster; generating a pending contract based on the chat information, and sending the pending contract to the second terminal device cluster, for P second terminal devices in the second terminal device cluster to each generate a piece of second acknowledgment information that acknowledges the pending contract, P>0 and being a positive integer; and determining the pending contract as the target contract based on P pieces of second acknowledgment information, and uploading the target contract to a blockchain.

According to an aspect of the present specification, a terminal device is provided, where the terminal device includes: a first generation module, configured to generate, based on an operation instruction of a first user, a joint contract signing request to jointly sign a contract with a second user cluster; a first sending module, configured to send the joint contract signing request to a second terminal device cluster corresponding to the second user cluster, a second user in the second user cluster being one-to-one corresponding to a second terminal device in the second terminal device cluster, for M second terminal devices in the second terminal device cluster to each generate and return, based on the joint contract signing request, a piece of first acknowledgment information that acknowledges jointly signing a contract, M>0 and being a positive integer; a first determining module, configured to determine, based on M pieces of first acknowledgment information, chat information from group chat records in a same chat group as the second user cluster; a second generation module, configured to: generate a pending contract based on the chat information, and send the pending contract to the second terminal device cluster, for P second terminal devices in the second terminal device cluster to each generate a piece of second acknowledgment information that acknowledges the pending contract, P>0 and being a positive integer; and a second determining module, configured to: determine the pending contract as the target contract based on P pieces of second acknowledgment information, and uploading the target contract to a blockchain.

According to an aspect of the present specification, a method for generating a target contract is provided, where the method includes: generating, based on an operation instruction of a first user, a separate contract signing request to separately sign a contract with each second user in a second user cluster; sending the separate contract signing request to a second terminal device cluster corresponding to the second user cluster, a second user in the second user cluster being one-to-one corresponding to a second terminal device in the second terminal device cluster, for M second terminal devices in the second terminal device cluster to each separately generate and return, based on the separate contract signing request, a piece of first acknowledgment information that acknowledges signing a contract, M>0 and being a positive integer; determining, based on M pieces of first acknowledgment information, chat information from group chat records in a same chat group as the second user cluster; generating a pending contract based on the chat information, and sending the pending contract to the second terminal device cluster, so the M second terminal devices in the second terminal device cluster separately generate a piece of second acknowledgment information that acknowledges the pending contract; and determining, based on the second acknowledgment information sent separately by the M second terminal devices, the pending contract as a target contract agreed upon with each of the M second terminal devices, and uploading M target contracts to a blockchain.

According to an aspect of the present disclosure, a terminal device is provided, including: a first generation unit, configured to generate, based on an operation instruction of a first user, a separate contract signing request to separately sign a contract with each second user in a second user cluster; a first sending unit, configured to send the separate contract signing request to a second terminal device cluster corresponding to the second user cluster, a second user in the second user cluster being one-to-one corresponding to a second terminal device in the second terminal device cluster, for M second terminal devices in the second terminal device cluster to each separately generate and return, based on the separate contract signing request, a piece of first acknowledgment information that acknowledges signing a contract, M>0 and being a positive integer; a first determining unit, configured to determine, based on M pieces of first acknowledgment information, chat information from group chat records in a same chat group as the second user cluster; a second generation unit, configured to: generate a pending contract based on the chat information, and send the pending contract to the second terminal device cluster, so the M second terminal devices in the second terminal device cluster separately generate a piece of second acknowledgment information that acknowledges the pending contract; and a second determining unit, configured to: determine, based on the second acknowledgment information sent separately by the M second terminal devices, the pending contract as a target contract agreed upon with each of the M second terminal devices, and upload M target contracts to a blockchain.

The present specification discloses a computer readable storage medium, on which a computer program is stored, and the program implements steps of the above method when being executed by a processor.

The present specification discloses a computer device, including a memory, a processor, and a computer program that is stored in the memory and can run on the processor, and the processor implements steps of the above method when executing the program.

With one or more technical solutions of the present specification, the present specification has the following beneficial technical effects or advantages:

One or more implementations of the present specification disclose a method for generating a target contract and a terminal device. To alleviate or partially alleviate a dispute generated in a transaction on the Internet, a joint contract signing request to sign a contract with a second user cluster is generated based on an operation instruction of a first user. Then, the joint contract signing request is sent to a second terminal device cluster corresponding to the second user cluster, for M second terminal devices in the second terminal device cluster to generate and return, based on the joint contract signing request, a piece of first acknowledgment information that acknowledges signing a contract. Based on M pieces of first acknowledgment information, chat information is determined from group chat records in a same chat group as the second user cluster, a pending contract is generated based on the chat information, and the pending contract is sent to the second terminal device, for P second terminal devices in the second terminal device cluster to generate a piece of second acknowledgment information that acknowledges the pending contract; and the pending contract is determined as the target contract based on P pieces of second acknowledgment information. It can be understood that, in one or more implementations of the present specification, a contract is generated by using chat information in a network, so a contract can be concluded simply and quickly, so as to alleviate a transaction dispute between two parties due to lack of contract awareness or insufficient communication. Therefore, rights and obligations can be determined based on the contract, transaction disputes can be reduced, and a standard rights and obligations determining basis is provided for the transaction. In addition, uploading the target contract to a blockchain can achieve a purpose of evidence storage.

The description is merely an overview of the technical solutions of the present specification. To more clearly understand the technical means of the present specification to implement the content of the present specification, and to make the previous and other objectives, features, and advantages of the present specification more comprehensible, the following lists specific implementations of the present specification.

BRIEF DESCRIPTION OF THE SEVERAL VIEWS OF THE DRAWINGS

By reading detailed descriptions of the following preferred implementations, a person of ordinary skill in the art clearly understands various other advantages and benefits. Accompanying drawings are merely used to show objectives of the preferred implementations, but are not considered as a limitation on the present specification. In addition, a same reference numeral is used to indicate a same part in all accompanying drawings. In the accompanying drawings.

DETAILED DESCRIPTION

The following describes the example implementations of the present disclosure in more detail with reference to the accompanying drawings. Although the accompanying drawings show example implementations of the present disclosure, it should be understood that the present disclosure can be implemented in various forms, and shall not be limited by the implementations described here. Instead, these implementations are provided to make a person skilled in the art more thoroughly understand the present disclosure and the scope of the present disclosure.

One or more implementations of the present specification provide a method for generating a target contract and a terminal device, so as to alleviate a dispute generated in a transaction on the Internet in the existing technologies.

Figure 1:
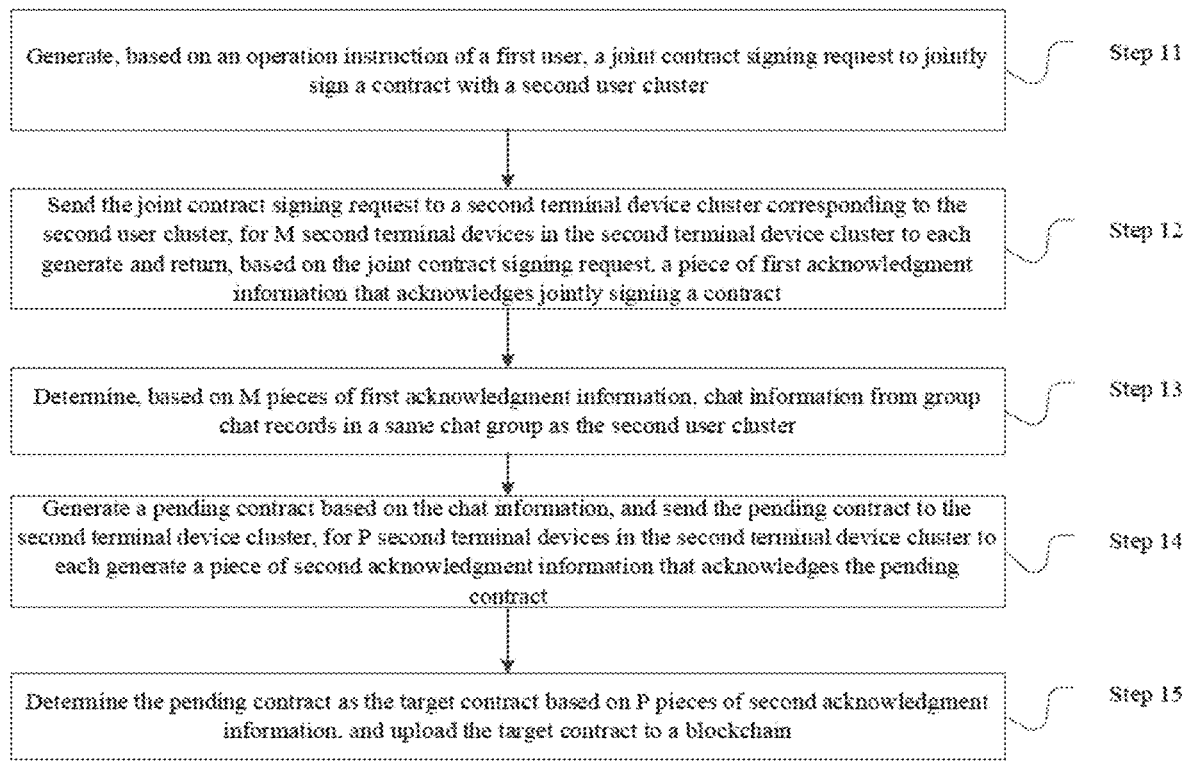
FIG. 1 is an implementation process diagram illustrating a method for generating a target contract according to an implementation of the present specification.

In an optional implementation, an implementation of the present specification discloses a method for generating a target contract. The method is applied to a first terminal device, and is a process of receiving an operation of a user and negotiating with a second terminal device, to generate a target contract. In some specific implementation processes, two terminal devices need to install a same application (APP), and then the APPs of the two terminal devices interact with each other to generate a target contract. Referring to FIG. 1, a specific implementation process of the method includes the following steps.

Step 11: Generate, based on an operation instruction of a first user, a joint contract signing request to jointly sign a contract with a second user cluster.

In some specific implementation processes, the operation instruction is generated by the first terminal device after receiving the operation of the first user. Operations of the first user include but are not limited to a user input such as sliding, touching, tapping, double-tapping, three-tapping, and long-pressing on a display interface of the APP on the first terminal device, a voice command, or a gesture input of the user. These operations can be a single-hand operation, a double-finger operation, and a three-finger operation.

The number of second users in the second user cluster is not fixed. There may be only one second user in the second user cluster, or there are more than two second users in the second user cluster.

Therefore, this implementation includes two cases.

In the first case, there is only one second user in the second user cluster, and "being in a same chat group as the second user cluster" has two different meanings: The first meaning is that the first user and the second user are in a same chat group. This chat group needs to be set up, and a friend can be added to the group chat. In this case, the chat group includes only two persons: the first user and the second user.

Figure 2A:
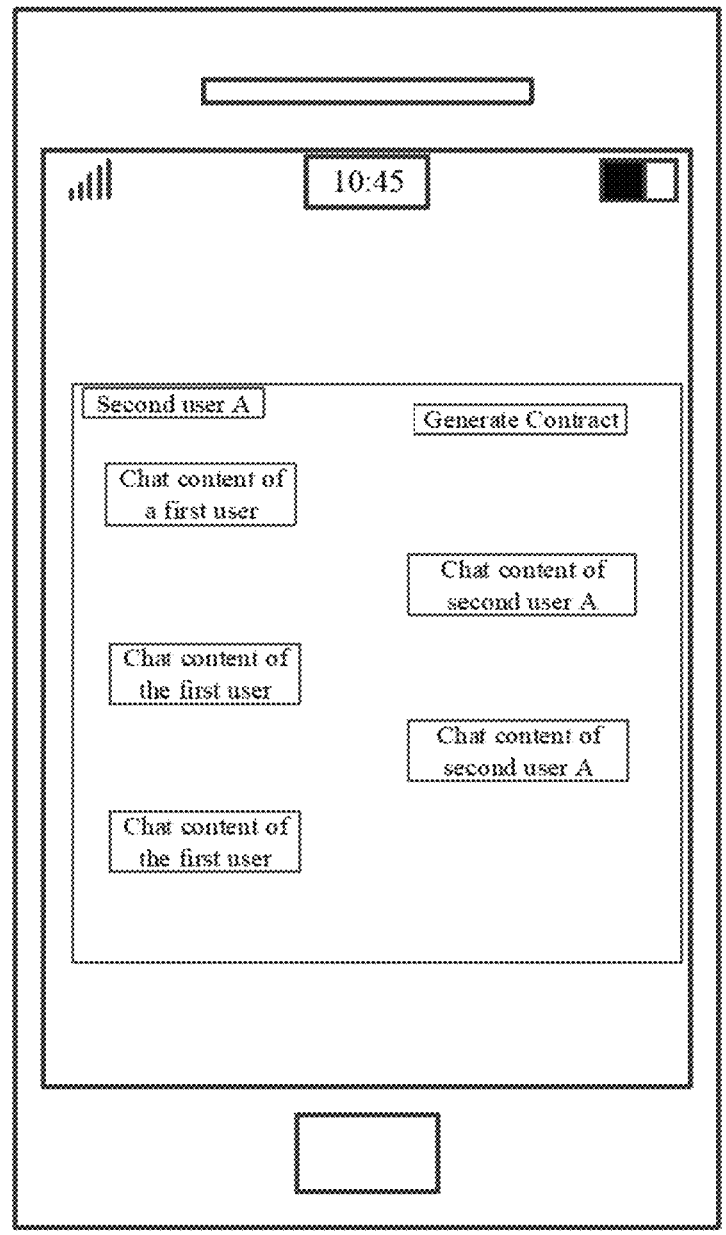
FIG. 2A and FIG. 2B show separate chat interfaces in an APP according to an implementation of the present specification.

In this case, referring to FIG. 2A, the display interface on the first terminal device is a group chat interface for chatting with one second user. A key "Generate Contract" is set at the top of the chat interface. When the key is tapped, the first terminal device generates a joint contract signing request to sign a contract with the second user.

The second meaning is that the display interface on the first terminal device of the first user includes a separate chat interface with the second user. In this case, the first user and the second user can also be considered as being in a same virtual chat group. Because the first user separately chats with the second user, the group chat record is a chat record between the two users.

In this case, the display interface on the first terminal device is a chat interface with the second user. On the chat interface, a key "Generate Contract" can be set. If the user taps the key, the first terminal device receives a tap operation of the user, and can generate a joint contract signing request to sign a contract with the second user. In addition, the joint contract signing request can be triggered in another method (for example, double-tapping or sliding).

Certainly, the first user can exchange information with many users, and the APP can be a payment-type APP, a chat-type APP, etc.

Figure 2B:
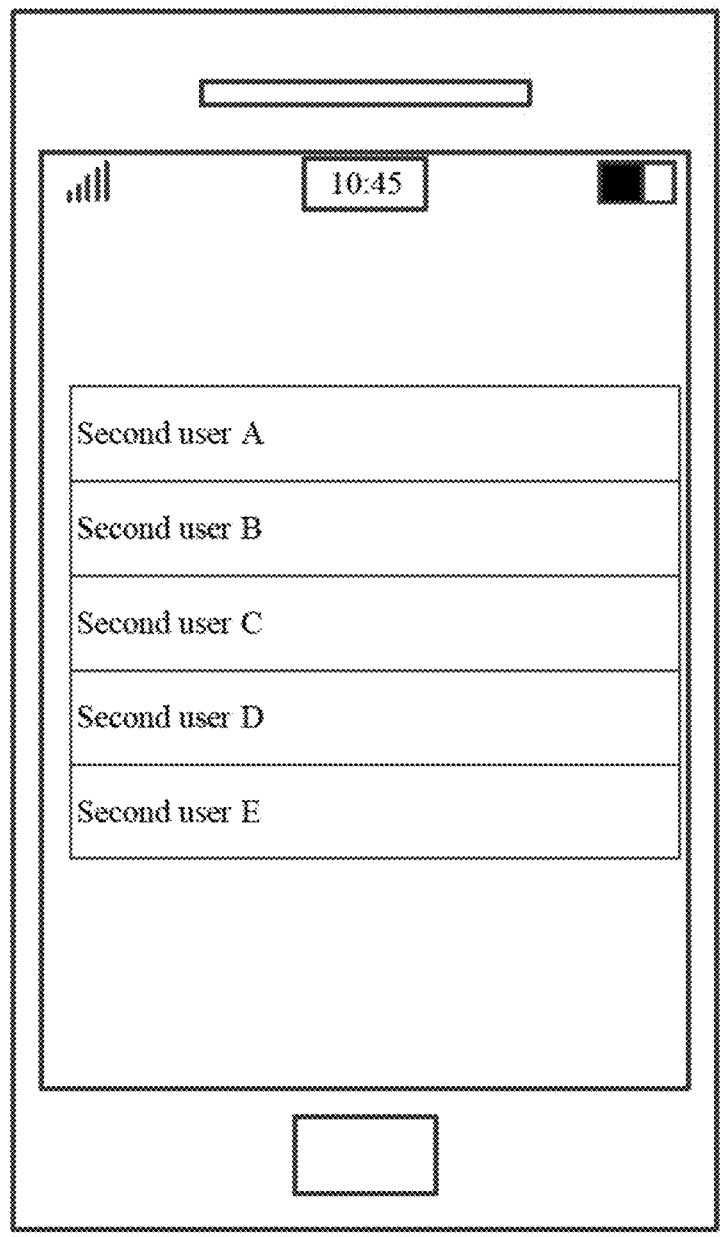

A payment-type APP is used as an example. Referring to FIG. 2B, which shows a display interface in the APP. On the display interface, a plurality of users are listed, and each user can be considered as a second user. If a certain second user is tapped, a chat interface between the first user and the second user is displayed. Referring to FIG. 2A, a key "Generate Contract" is disposed at the top of the chat interface. When the key is activated, e.g., tapped, the first terminal device generates a joint contract signing request to sign a contract with the second user.

In the second case, there are two or more second users in the second user cluster. The first user and all the second users can chat in the chat group, and the chat interface can be displayed to any user in the chat group.

Figure 3:
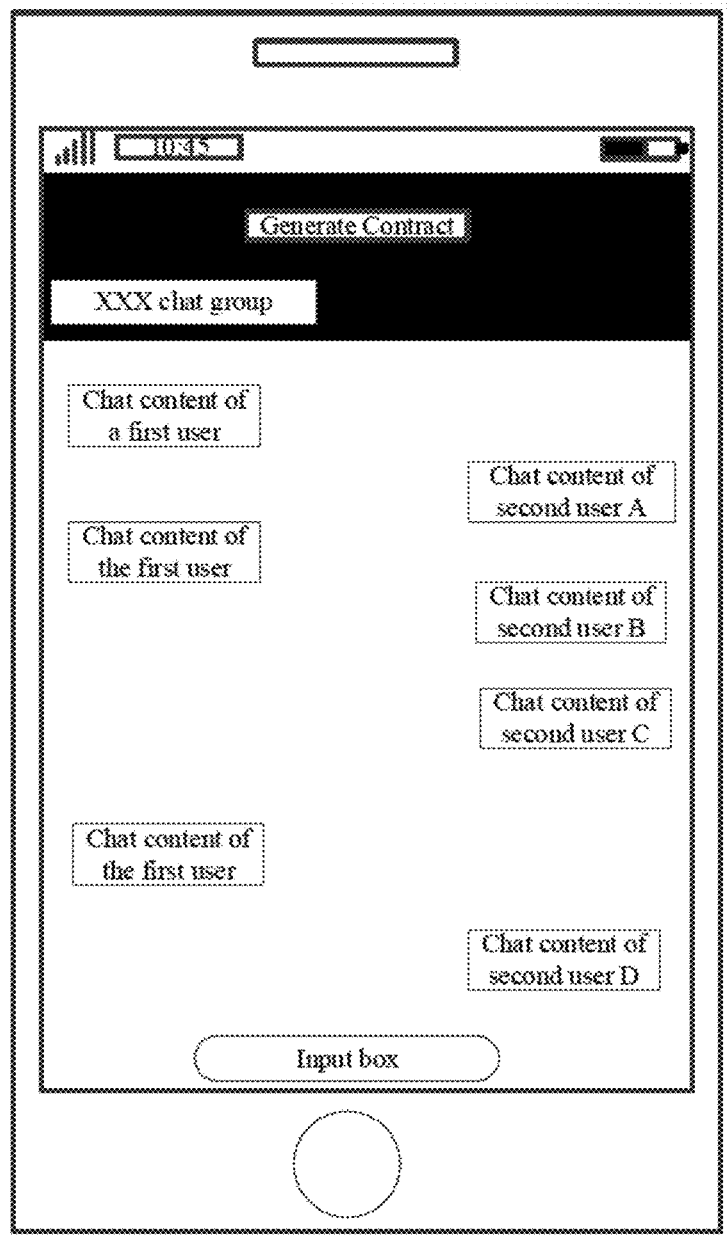
FIG. 3 shows a group chat interface in an APP according to an implementation of the present specification.

In this case, referring to FIG. 3, the display interface on the first terminal device is a group chat interface with four second users, and five user profile photos can be displayed on one side of the interface. A key "Generate Contract" is set at the top of the chat interface. When the key is tapped, the first terminal device generates a joint contract signing request to sign a contract with the second user.

In an optional implementation, the chat interface can be slid to the left or right, and the first terminal device generates, based on the slide operation as an instruction, a joint contract signing request to sign a contract with the second user.

Or, if the chat interface is double tapped, the first terminal device generates, based on the double-tap operation instruction, a joint contract signing request to sign a contract with the second user.

In an optional implementation, each user, the first user or the second user, has a credit level. Only when the credit level is met by both the first user and the second user, a joint contract signing request can be generated by the first user to sign a contract with the second user that also meets the credit level. This operation can alleviate contract disputes with a user having a poor credit level (that is, an insufficient credit level) and reduce the risk of contract disputes.

In some specific implementation processes, it is determined whether a credit level of the first user reaches a predetermined credit level. In response to the credit level of the first user reaching the predetermined credit level, the joint contract signing request can be sent to the second terminal device cluster; and in response to the credit level of the first user not reaching the predetermined credit level, one or more of first prompt information for displaying to the first user or second prompt information for sending to the second terminal device cluster is generated.

In some specific implementation processes, the first prompt information is generated and can be displayed to the first user, and the first user is prompted to pay attention to its credit level, so as to avoid having its permission to sign online contracts restricted due to a low credit level. In addition, the credit level of the first user is displayed to the second user clusters, so that each second user in the second user cluster can know the credit level of the first user and can predict a risk. Certainly, the credit level of the first user can be displayed to the first user and the second user cluster at the same time.

In an optional implementation, in response to the credit level of the first user not reaching the predetermined threshold credit level, the credit level of the first user can be monitored in real time and a second credit level of the first user can be obtained after the credit level of the first user changes. The second credit level of the first user, formed after the credit level of the first user changes, is determined in real time based on the predetermined credit level, until the second level reaches the predetermined credit level. For example, the predetermined credit level is level 3. If the credit level of the first user is level 1, it is determined that the credit level of the first user does not reach the predetermined credit level, and a change of the credit level of the first user is monitored and determined in real time until the credit level of the first user reaches the predetermined credit level. In this case, the first user is qualified to send the joint contract signing request to the second terminal device cluster.

Further, the meaning of "real-time monitoring" in this implementation includes monitoring with predetermined time intervals, for example, monitoring every 2 seconds. "Real-time monitoring" also includes continuous monitoring.

After the credit level of the first user reaches the predetermined credit level, third prompt information can be generated for display, so as to indicate that the credit level of the first user reaches the predetermined credit level, and the first user has a qualification of generating a contract. Further, query information can be further generated, so as to ask the first user whether to continue to send the joint contract signing request to the second terminal device cluster.

Step 12: Send the joint contract signing request to a second terminal device cluster corresponding to the second user cluster, for M second terminal devices in the second terminal device cluster to each generate and return, based on the joint contract signing request, a piece of first acknowledgment information that acknowledges jointly signing a contract, M>0 and being a positive integer.

The second user in the second user cluster is one-to-one corresponding to the second terminal device in the second terminal device cluster.

In some specific implementation processes, an APP display interface in each second terminal device can display the joint contract signing request. The joint contract signing request is sent by the first terminal device to each second terminal device, and the joint contract signing request is used to request to jointly sign a contract with the second terminal device cluster. That is, the contract signing is valid only after one or more second users jointly sign the contract.

For example, a key "Joint Contract Signing Request" is displayed in the APP, and then there are "OK" and "Cancel" keys. If the second user taps "OK," the second terminal device generates and returns a piece of first acknowledgment information that acknowledges jointly signing a contract.

Further, after the second user cluster receives the joint contract signing request, not all the second users will agree to the request, and therefore, not all the second terminal devices generate the first acknowledgment information.

Therefore, in the second terminal device cluster, if M second terminal devices generate corresponding first acknowledgment information based on the joint contract signing request, it can indicate that all the second terminal devices in the second terminal device cluster agree to perform joint contract signing. The value of M can be freely selected, for example, M is ½ of the second terminal devices in the second terminal device cluster, or M is ⅔ of the second terminal devices in the second terminal device cluster.

For example, the chat group in which the first user and the second user cluster (99 second users) are located is a shareholder chat group, and the first user and all the second users are shareholders. Assume that the first user initiates a joint contract signing request in the chat group by using the first terminal device. If ⅔ or more of the second users agree to sign the joint contract, it may be determined that the whole second user cluster agrees to jointly sign the contract. Assume that 78 second users agree to sign the joint contract, 78 second terminal devices generate first acknowledgment information, and jointly generate 78 pieces of first acknowledgment information, and each second terminal sends its first acknowledgment information to the first terminal device. Because 78 is larger than ⅔ of 99, i.e., 66, it can be determined that the whole second user cluster of 99 second users agrees to jointly sign the contract.

Step 13: Determine, based on M pieces of first acknowledgment information, chat information from group chat records in a same chat group as the second user cluster.

In an implementation process of determining the chat information, the user can specify one or more pieces of information in the chat records as the chat information.

For example, a second tap operation of the first user can be received, and all information in the chat records is changed to a candidate state. For example, a check area can be set in each piece of information, then a selection operation (for example, a check operation) of the user is received, and the chat information is determined from the chat records.

Step 14: Generate a pending contract based on the chat information, and sending the pending contract to the second terminal device cluster, for P second terminal devices in the second terminal device cluster to each generate a piece of second acknowledgment information that acknowledges the pending contract, P>0 and being a positive integer.

The chat information in one or more implementations of the present specification includes text information, number information (such as money transfer information), letter information, symbol information, etc.

In example specific processes of generating the pending contract based on the chat information, the chat information can be converted, based on a format template of the target contract, into contract content (such as a standard term) that meets a requirement of the target contract.

In an optional implementation, a keyword of the chat information can be further extracted, and the keyword is converted into contract content that meets the pending contract.

In an optional implementation, the chat information can be directly added in the pending contract in a form of a picture, a character, etc., without processing the chat information. Word meaning recognition is performed on the chat information, the chat information is converted into text agreement information in a standard format, and the text agreement information is added into the pending contract.

The above implementation includes three methods for directly adding the chat information into the pending contract. In this case, the chat information can be directly added into the pending contract when the chat information is clear, e.g., meeting a clarity threshold, and there is no objection to the information.

If ambiguous information exists in the chat information, for example, a plurality of meanings of the information lead to ambiguity, the second terminal device can be interacted with in respect to the ambiguous information, and the first user and the second user cluster jointly discuss to generate corresponding explanation information, and add the corresponding explanation information into the pending contract.

Assume that the second user cluster includes one second user, and the first user transfers money to a single second user. Both parties can add that the transfer information is transfer information of payment for goods of model XXX, and add the supplementary content into the pending contract.

In addition, because the contract is normative, the chat information can be converted into text agreement information, and the text agreement information is added into the pending contract.

Additionally, to ensure contract integrity, after the chat information is directly added into the pending contract, word meaning recognition is performed on the chat information, then the chat information is converted into text agreement information in a standard format, and the text agreement information is added into the pending contract.

In an optional implementation, supplementary content from the first user can be further received, and the chat information and the supplementary content from the first user are combined into the pending contract. For example, on the display interface of the APP of the first terminal, an operation interface for the user to supplement content can be displayed. The first user can supplement content in the operation interface. The first terminal device can also add the supplementary content into the pending contract.

In an optional implementation, after the pending contract is generated based on the chat information, the method further includes: analyzing whether content of the pending contract is ambiguous by using a machine learning model; in response to there being no ambiguity, sending the pending contract to the second terminal device; and in response to there being ambiguity, generating prompt information indicating ambiguous information in the pending contract, so as to prompt the first user to process the ambiguous information; and receiving explanation information obtained after the first user processes the ambiguity information, and adds the explanation information into the pending contract.

Certainly, in response to there being ambiguity, the second terminal device cluster can further be interacted with in respect of the ambiguous information in the pending contract, and the first user and the second user cluster jointly discuss to generate corresponding explanation information, and add the corresponding explanation information into the target contract together.

In an optional implementation, after the pending contract is generated based on the chat information, and the pending contract is sent to the second terminal device, one or more times of comment exchange can be performed with the second terminal device cluster based on the pending contract. This comment exchange may be cyclic and can be performed for a plurality of times. After the comment exchange, negotiation information corresponding to the pending contract is obtained. The negotiation information is added into the pending contract as supplementary content of the corresponding pending contract. In a specific comment exchange process, both parties need to agree on the final comment information and use it as the negotiation information determined after their negotiation.

The above describes a plurality of implementations of generating the pending contract based on the chat information.

In one or more of the implementations described above, a case in which the first user and the second user cluster jointly negotiate to determine the pending contract is used. In this case, the second user cluster can jointly sign the pending contract.

To store the chat information and preserve the original evidence of the target contract, the chat information can be uploaded to a blockchain for storage, or the chat information is encrypted and uploaded to the blockchain for storage.

After the pending contract is sent to the second terminal device, the second terminal device generates a piece of second acknowledgment information that acknowledges the pending contract. Then the first terminal device performs the following steps.

In an optional implementation, P=M, that is, the number of second terminal devices that generate the first acknowledgment information is equal to the number of second terminal devices that generate the second acknowledgment information. Additionally, M second terminal devices that generate the first acknowledgment information may be different from M second terminal devices that generate the second acknowledgment information. For example, the second terminal devices that generate the first acknowledgment information are a second terminal device of user 1, a second terminal device of user 2, and a second terminal device of user 3. The second terminal devices that generate the second acknowledgment information are a second terminal device of user 4, a second terminal device of user 5, and a second terminal device of user 6. That is, there are three second terminal devices in both cases.

In an optional implementation, P≠M, that is, the number of second terminal devices that generate the first acknowledgment information is not equal to the number of second terminal devices that generate the second acknowledgment information. For example, the second terminal devices that generate the first acknowledgment information are a second terminal device of user 1, a second terminal device of user 2, and a second terminal device of user 3, that is, three second terminal devices in total. The second terminal devices that generate the second acknowledgment information are a second terminal device of user 1, a second terminal device of user 2, a second terminal device of user 3, and a second terminal device of user 4, that is, four second terminal devices in total. User 4 does not agree to sign the contract, but agrees to acknowledge the pending contract.

Step 15: Determine the pending contract as the target contract based on P pieces of second acknowledgment information, and uploading the target contract to a blockchain.

In an optional implementation, the target contract can be further sent to the second terminal device cluster for storage, so each second terminal device stores the target contract.

In an optional implementation, after the target contract is uploaded to the blockchain, the target contract can further be downloaded from the blockchain.

The above is an implementation process of the method for generating a target contract. To describe and explain one or more implementations of the present specification, five users (one first user and four second users) are used as examples, and the five users are located in a same shareholder chat group.

The chat information in the chat group is "The company invested 3 million RMB in XXX real estate this year."

The first user taps the key "Generate Contract." The first terminal device sends a joint contract signing request to the four second terminal devices.

Assume that three of the four second users agree, each of the three second terminal devices generates first acknowledgment information, and sends the first acknowledgment information to the first terminal device.

Therefore, the first terminal device receives three pieces of first acknowledgment information, and based on this, the first user checks the chat information "The company invested 3 million RMB in XXX real estate this year," generates a pending contract, and sends the pending contract to the four second terminal devices.

In this case, the first terminal device and the four second terminal devices can negotiate one or more times based on the pending contract, and supplementary content is formed after the negotiation. The first terminal device can supplement the content to the pending contract, and send the supplementary pending contract to the four second terminal devices. Assume that all the four second terminal devices agree, all of them generate second acknowledgment information separately. The first terminal device determines the pending contract as a target contract, and uploads the target contract to the blockchain.

It can be understood that the pending contract is a contract determined through negotiation between the first user and the four second users. Signatures on the contract include a signature of the first user and a joint signature of the four second users.

Figure 4:
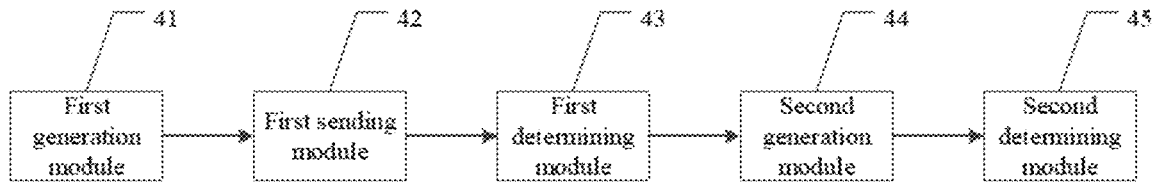
FIG. 4 is a schematic diagram illustrating a terminal device according to an implementation of the present specification.

Based on the same inventive concept, referring to FIG. 4, the following implementation describes a terminal device, where the terminal device includes: a first generation module 41, configured to generate, based on an operation instruction of a first user, a joint contract signing request to jointly sign a contract with a second user cluster; a first sending module 42, configured to send the joint contract signing request to a second terminal device cluster corresponding to the second user cluster, a second user in the second user cluster being one-to-one corresponding to a second terminal device in the second terminal device cluster, for M second terminal devices in the second terminal device cluster to each generate and return, based on the joint contract signing request, a piece of first acknowledgment information that acknowledges jointly signing a contract, M>0 and being a positive integer; a first determining module 43, configured to determine, based on M pieces of first acknowledgment information, chat information from group chat records in a same chat group as the second user cluster; a second generation module 44, configured to: generate a pending contract based on the chat information, and send the pending contract to the second terminal device cluster, for P second terminal devices in the second terminal device cluster to each generate a piece of second acknowledgment information that acknowledges the pending contract, P>0 and being a positive integer; and a second determining module 45, configured to: determine the pending contract as the target contract based on P pieces of second acknowledgment information, and uploading the target contract to a blockchain.

In an optional implementation, the terminal device further includes: a determining module, configured to determine whether a credit level of the first user reaches a predetermined credit level; a second sending module, configured to: in response to the credit level of the first user reaching the predetermined credit level, sending the joint contract signing request to the second terminal device cluster; and a monitoring module, configured to: in response to the credit level of the first user not reaching the predetermined credit level, generating one or more of first prompt information for displaying to the first user or second prompt information for sending to the second terminal device cluster.

In an optional implementation, the second generation module 44 includes one or more of: a first adding module, configured to directly add the chat information into the pending contract; or a second adding module, configured to: perform word meaning recognition on the chat information, convert the chat information into text agreement information in a standard format, and add the text agreement information into the pending contract.

In an optional implementation, the second generation module 44 includes: a receiving module, configured to receive supplementary content from the first user; and a combination module, configured to combine the chat information and the supplementary content from the first user into the pending contract.

In an optional implementation, the terminal device further includes: an acquisition module, configured to perform one or more times of comment exchange with the second terminal device cluster based on the pending contract to obtain negotiation information corresponding to the pending contract; and a third adding module, configured to add the negotiation information into the pending contract as supplementary content of the corresponding pending contract.

In an optional implementation, the terminal device further includes: an analysis module, configured to analyze whether a logic expression of the pending contract is clear, e.g., meeting a clarity threshold, by using a machine learning model; an execution module, configured to: in response to that the logic expression of the pending contract is clear, e.g., meeting the clarity threshold, send the pending contract to the second terminal device cluster; and a third generation module, configured to: in response to the logic expression of the pending contract not being clear, e.g., not meeting the clarity threshold, generating prompt information indicating ambiguous information in the pending contract, so as to prompt the first user to process the ambiguous information; and receiving explanation information obtained after the first user processing the ambiguity information, and adding the explanation information into the pending contract.

In an optional implementation, the terminal device further includes: a downloading module, configured to download the target contract from the blockchain.

Figure 5:
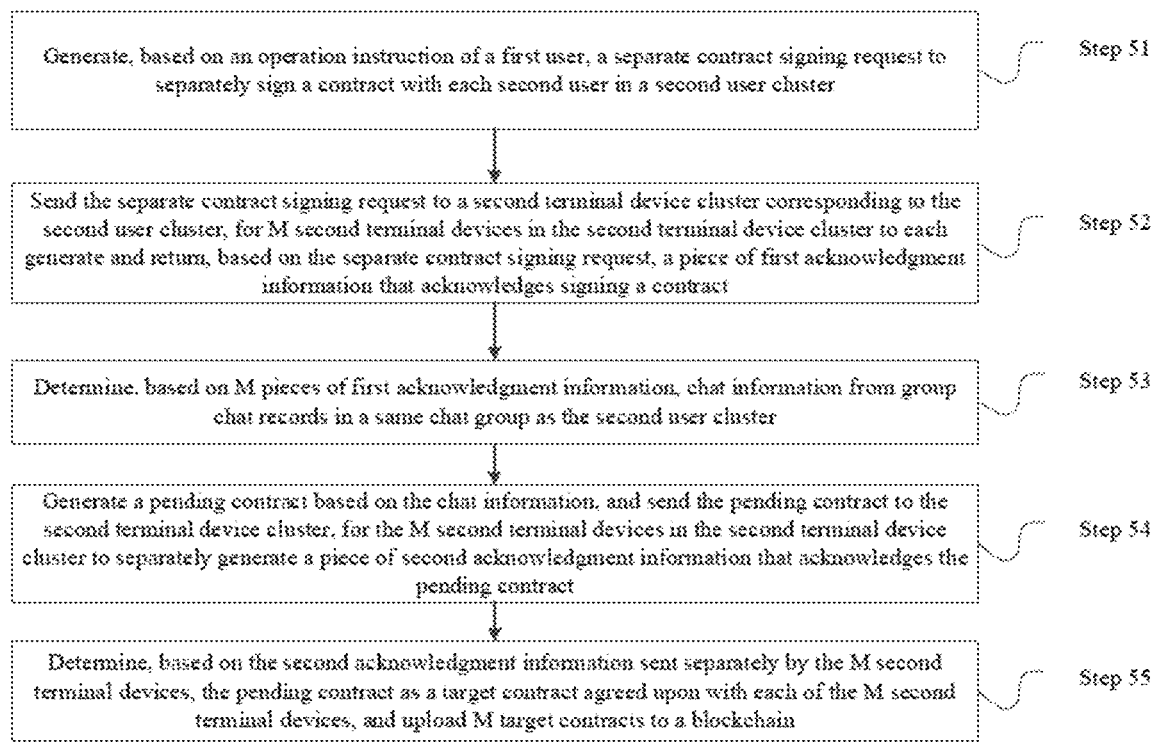
FIG. 5 is another implementation process diagram illustrating a method for generating a target contract according to an implementation of the present specification.

Based on the same inventive concept, one or more implementations of the present specification further disclose a method for generating a target contract. Referring to FIG. 5, the method includes the following steps.

Step 51: Generate, based on an operation instruction of a first user, a separate contract signing request to separately sign a contract with each second user in a second user cluster.

In some specific implementation processes, the operation instruction is generated by the first terminal device after receiving the operation of the first user. Operations of the first user include but are not limited to sliding, touching, tapping, double-tapping, three-tapping, and long-pressing on a display interface of the APP on the first terminal device. These operations can be a single-hand operation, a double-finger operation, and a three-finger operation.

In an optional implementation, the sending the separate contract signing request to the second terminal device cluster corresponding to the second user cluster includes: separately sending the separate contract signing request to respective second terminal devices.

The number of second users in the second user cluster is not fixed. There may be only one second user in the second user cluster, or there are more than two second users in the second user cluster.

Therefore, this implementation includes two cases.

In the first case, there is only one second user in the second user cluster, and "being in a same chat group as the second user cluster" has two different meanings: The first meaning is that the first user and the second user are in a same chat group. This chat group needs to be set up, and a friend can be added to the group chat. In this case, the chat group includes only two persons: the first user and the second user.

In this case, referring to FIG. 2A, the display interface on the first terminal device is a group chat interface with one second user, and a user profile photo can be displayed on one side of the interface. A key "Generate Contract" is set at the top of the chat interface. When the key is tapped, the first terminal device generates a separate contract signing request to sign a contract with the second user, and the separate contract signing request is sent to each second terminal device.

The second meaning is that the display interface on the first terminal device of the first user includes a separate chat interface with the second user. In this case, the first user and the second user can also be considered as being in a same virtual chat group. Because the first user separately chats with the second user, the group chat record is a chat record between the two users.

In this case, the display interface on the first terminal device is a chat interface with the second user. On this chat interface, a key "Generate Contract" can be set. If the user taps the key, the first terminal device receives a tap operation of the user, and can generate a separate contract signing request to sign a contract with the second user. In addition, the separate contract signing request can be triggered in another method (for example, double-tapping or sliding).

Additionally, the first user can exchange information with many users, and the APP can be a payment-type APP, a chat-type APP, etc.

A payment-type APP is used as an example. Referring to FIG. 2B, which shows a display interface in the APP. On the display interface, a plurality of users are listed, and each user can be considered as a second user. If a certain second user is tapped, a chat interface between the first user and the second user is displayed. Referring to FIG. 2A, a key "Generate Contract" is disposed at the top of the chat interface. When the key is tapped, the first terminal device generates a separate contract signing request to sign a contract with the second user.

In the second case, there are two or more second users in the second user cluster. The first user and all the second users can chat in the chat group, and the chat interface can be displayed to any user in the chat group.

In this case, referring to FIG. 3, the display interface on the first terminal device is a group chat interface with four second users, and five user profile photos can be displayed on one side of the interface. A key "Generate Contract" is set at the top of the chat interface. When the key is tapped, the first terminal device generates a separate contract signing request to sign a contract with the second user.

In an optional implementation, the chat interface can be slid to the left or right, and the first terminal device generates, based on the slide operation as an instruction, a contract signing request to sign a contract with the second user.

Or, if the chat interface is double tapped, the first terminal device generates, based on the double-tap operation instruction, a separate contract signing request to sign a contract with the second user.

In an optional implementation, each user has a credit level. Only when the credit level is met, can a separate contract signing request be generated to sign a contract with each second user. This operation can alleviate contract disputes with a user having a poor credit level (that is, an insufficient credit level) and reduce the risk of contract disputes.

In some specific implementation processes, it is determined whether a credit level of the first user reaches a predetermined credit level. In response to the credit level of the first user reaching the predetermined credit level, the contract signing request can be sent to the second terminal device cluster; and in response to the credit level of the first user not reaching the predetermined credit level, one or more of first prompt information for displaying to the first user or second prompt information for sending to the second terminal device cluster is generated.

In some specific implementation processes, the first prompt information is generated and can be displayed to the first user, and the first user is prompted to pay attention to its credit level, so as to avoid having its permission to sign online contracts restricted due to a low credit level. In addition, the credit level of the first user is displayed to the second user clusters, so that each second user in the second user cluster can know the credit level of the first user and can predict a risk. Certainly, the credit level of the first user can be displayed to the first user and the second user cluster at the same time.

In an optional implementation, in response to the credit level of the first user not reaching the predetermined threshold credit level, the credit level of the first user can be monitored in real time and a second credit level of the first user can be obtained after the credit level of the first user changes. The second credit level of the first user, formed after the credit level of the first user changes, can be monitored in real time, and the second level formed after the credit level of the first user changes is determined in real time based on the predetermined credit level, until the second level reaches the predetermined credit level. For example, the predetermined credit level is level 3. If the credit level of the first user is level 1, it is determined that the credit level of the first user does not reach the predetermined credit level, and a change of the credit level of the first user is monitored and determined in real time until the credit level of the first user reaches the predetermined credit level. In this case, the first user is qualified to send the contract signing request to the second terminal device cluster.

Further, the meaning of "real-time monitoring" in this implementation includes monitoring with predetermined time intervals, for example, monitoring every 2 seconds. "Real-time monitoring" also includes continuous monitoring.

After the credit level of the first user reaches the predetermined credit level, third prompt information can be generated for display, so as to indicate that the credit level of the first user reaches the predetermined credit level, and the first user has a qualification of generating a contract. Further, query information can be further generated, so as to ask the first user whether to continue to send the separate contract signing request to the second terminal device cluster.

Step 52: Send the separate contract signing request to a second terminal device cluster corresponding to the second user cluster, for M second terminal devices in the second terminal device cluster to each generate and return, based on the separate contract signing request, a piece of first acknowledgment information that acknowledges signing a contract.

M>0 and is a positive integer.

The second user in the second user cluster is one-to-one corresponding to the second terminal device in the second terminal device cluster.

In some specific implementation processes, the APP display interface in each second terminal device can display the separate contract signing request. That is, the separate contract signing request is sent by the first terminal device to each second terminal device, and the separate contract signing request is used to request to separately sign a contract with each second terminal device.

For example, a key "Separate Contract Signing Request" is displayed in the APP, and then there are "OK" and "Cancel" keys. If the second user taps "OK," the second terminal device generates and returns a piece of first acknowledgment information that acknowledges separately signing a contract.

Further, after the second user cluster receives the separate contract signing request, the second user cluster can choose to accept the separate contract signing or reject the separate contract signing. Therefore, not all the second users agree on the separate contract signing, that is, not all the second terminal devices generate the first acknowledgment information.

Therefore, in the second terminal device cluster, if M second terminal devices generate corresponding first acknowledgment information based on the separate contract signing request, it can indicate that all the second terminal devices in the second terminal device cluster agree to perform separate contract signing. The value of M can be freely selected, for example, M is ½ of the second terminal devices in the second terminal device cluster, or M is ⅔ of the second terminal devices in the second terminal device cluster.

For example, the chat group in which the first user and the second user cluster (99 second users) are located is an employee chat group, and all the second users are employees. Assume that the first user initiates a separate contract signing request in the chat group by using the first terminal device, and assume that 78 second users agree to perform separate contract signing. Then, 78 second terminal devices generate first acknowledgment information, 78 pieces of first acknowledgment information are generated in total, and each second terminal sends its respective first acknowledgment information to the first terminal device.

Step 53: Determine, based on M pieces of first acknowledgment information, chat information from group chat records in a same chat group as the second user cluster.

In an implementation process of determining the chat information, the user can specify one or more pieces of information in the chat records as the chat information.

A second tap operation of the first user can be received, and all information in the chat records is changed to a candidate state. For example, a check area can be set in each piece of information, then a selection operation (for example, a check operation) of the user is received, and the chat information is determined from the chat records.

Step 54: Generate a pending contract based on the chat information, and send the pending contract to the second terminal device cluster, so the M second terminal devices in the second terminal device cluster separately generate a piece of second acknowledgment information that acknowledges the pending contract.

The chat information in one or more implementations of the present specification includes text information, number information (such as money transfer information), letter information, symbol information, etc.

In example specific processes of generating the pending contract based on the chat information, the chat information can be converted, based on a format template of the target contract, into contract content (such as a standard term) that meets a requirement of the target contract.

In an optional implementation, a keyword of the chat information can be further extracted, and the keyword is converted into contract content that meets the pending contract.

In an optional implementation, the chat information can be directly added in the pending contract in a form of a picture, a character, etc., without processing the chat information. Word meaning recognition is performed on the chat information, the chat information is converted into text agreement information in a standard format, and the text agreement information is added into the pending contract.

The above implementation includes three methods for directly adding the chat information into the pending contract. In this case, the chat information can be directly added into the pending contract when the chat information is clear, e.g., meeting a clarity threshold, and there is no objection to the information.

If ambiguous information exists in the chat information, for example, a plurality of meanings of the information lead to ambiguity, the second terminal device can be interacted with in respect to the ambiguous information, and the first user and the second user cluster jointly discuss to generate corresponding explanation information, and add the corresponding explanation information into the pending contract.

Assume that the second user cluster includes one second user, and the first user transfers money to a single second user. Both parties can add that the transfer information is transfer information of payment for goods of model XXX, and add the supplementary content into the pending contract.

In addition, because the contract is normative, the chat information can be converted into text agreement information, and the text agreement information is added into the pending contract.

Certainly, to ensure contract integrity, after the chat information is directly added into the pending contract, word meaning recognition is performed on the chat information, then the chat information is converted into text agreement information in a standard format, and the text agreement information is added into the pending contract.

In an optional implementation, supplementary content from the first user can be further received, and the chat information and the supplementary content from the first user are combined into the pending contract. For example, on the display interface of the APP of the first terminal, an operation interface for the user to supplement content can be displayed. The first user can supplement content in the operation interface. The first terminal device can also add the supplementary content into the pending contract.

In an optional implementation, after the pending contract is generated based on the chat information, the method further includes: analyzing whether content of the pending contract is ambiguous by using a machine learning model; in response to there being no ambiguity, sending the pending contract to the second terminal device; and in response to there being ambiguity, generating prompt information indicating ambiguous information in the pending contract, so as to prompt the first user to process the ambiguous information; and receiving explanation information obtained after the first user processing the ambiguity information, and adding the explanation information into the pending contract.

Certainly, in response to there being ambiguity, the second terminal device cluster can further be interacted with in respect to the ambiguous information in the pending contract, and the first user and the second user cluster jointly discuss to generate corresponding explanation information, and add the corresponding explanation information into the target contract together.

In an optional implementation, after the pending contract is generated based on the chat information, and the pending contract is sent to the second terminal device, comments can further be exchanged with each second terminal device in the second terminal device cluster based on the pending contract, to obtain negotiation information for each second terminal device. In a process of exchange between the first terminal device and a single second terminal device, this comment exchange may be cyclic, and comments can be discussed for a plurality of times. After the comment exchange, negotiation information corresponding to the pending contract is obtained. The negotiation information for each second terminal device is separately added into a corresponding pending contract, as supplementary content of the corresponding pending contract for the second terminal device.

In a specific comment exchange process, both parties need to agree on the final comment information and use it as the negotiation information determined after their negotiation.

The above describes a plurality of implementations of generating the pending contract based on the chat information.

In one or more of the above implementations, a case in which the first user and each second user in the second user cluster separately negotiate to determine a corresponding pending contract is used. In this case, the second user cluster needs to separately determine a corresponding pending contract with the first user, and contract signatures are also a separate signature of each second user and a signature of a first user.

To store the chat information and preserve the original evidence of the target contract, the chat information can be uploaded to a blockchain for storage, or the chat information is encrypted and uploaded to the blockchain for storage.

After the pending contract is sent to the second terminal device, the second terminal device generates a piece of second acknowledgment information that acknowledges the pending contract. Then the first terminal device performs the following steps.

In an optional implementation, the number of second terminal devices that generate the first acknowledgment information is equal to the number of second terminal devices that generate the second acknowledgment information. That is, only when the second terminal device acknowledges generating the first acknowledgment information, the first terminal device sends the pending contract to the second terminal device. If the second terminal device does not generate the first acknowledgment information, it indicates that the second user corresponding to the second terminal device does not agree to sign the contract.

As such, the first terminal device can have the following several processing cases:

Case 1: The pending contract is sent only to the M second terminal devices that agree to sign the contract.

Case 2: The pending contract is sent to the second terminal device cluster, but only the M second terminal devices that generate the first acknowledgment information generate the second acknowledgment information.

Case 3: The pending contract is sent to the second terminal device cluster, and P second terminal devices can generate second acknowledgment information, and P≠M. That is, the number of second terminal devices that generate the first acknowledgment information is different from the number of second terminal devices that generate the second acknowledgment information. For example, the second terminal devices that generate the first acknowledgment information are a second terminal device of user 1, a second terminal device of user 2, and a second terminal device of user 3, that is, three second terminal devices in total. The second terminal devices that generate the second acknowledgment information are a second terminal device of user 1, a second terminal device of user 2, a second terminal device of user 3, and a second terminal device of user 4, that is, four second terminal devices in total. User 4 does not agree to sign the contract, but agrees to acknowledge the pending contract.

Step 55: Determine, based on the second acknowledgment information sent separately by the M second terminal devices, the pending contract as a target contract agreed upon with each of the M second terminal devices, and upload M target contracts to a blockchain.

In an optional implementation, the target contract can be further sent to the second terminal device cluster for storage, so each second terminal device stores the target contract.

In an optional implementation, after the target contract is uploaded to the blockchain, the target contract can further be downloaded from the blockchain.

The above is an implementation process of the method for generating a target contract. To describe and explain one or more implementations of the present specification, five users (one first user and four second users) are used as examples, and the five users are located in a same employee chat group.

The chat information in the chat group is "The salary of each employee will rise 3000 RMB at the end of the year."

The first user taps the key "Generate Contract." The first terminal device sends a joint contract signing request to the four second terminal devices.

Assume that three of the four second users agree, each of the three second terminal devices generates first acknowledgment information, and sends the first acknowledgment information to the first terminal device.

Therefore, the first terminal device receives three pieces of first acknowledgment information, and based on this, the first user checks the chat information "The salary of each employee will rise 3000 RMB at the end of the year," generates a pending contract, and sends the pending contract to the four second terminal devices.

In a negotiation process, because the case of each second user is different, the first terminal device can separately perform one or more times of negotiation with each second terminal device based on the pending contract. After the negotiation, supplementary content corresponding to each second terminal device is obtained. The supplementary content varies with a negotiation result of the user.

Therefore, in this case, the first terminal device can supplement the content corresponding to each second terminal device to the corresponding pending contract, and send the supplementary pending contract to the corresponding second terminal device. For example, if supplementary content of the first terminal device and second terminal device A is "content A," the first terminal device adds content A to a pending contract with the second terminal device, and then sends the pending contract to second terminal device A. Assume that supplementary content of the first terminal device and second terminal device B is "content B," the first terminal device adds content B to a pending contract with the second terminal device, and then sends the pending contract to second terminal device B.

Assume that all the four second terminal devices agree (there is a second user who did not agree previously, but later agrees on the pending contract; then, a second terminal device corresponding to the second user also generates second acknowledgment information), all the four second terminal devices separately generate second acknowledgment information. Then, the first terminal device determines, based on the second acknowledgment information of each second terminal device, a pending contract corresponding to the second terminal device as a target contract, and uploads the pending contract to the blockchain.

It can be understood that the pending contract is a contract determined through separate negotiation between the first user and the four second users, and content of the pending contract is different for different second users. Signatures on the pending contract include a signature of the first user and a separate signature of each second user.

One or more implementations of the present specification disclose a method for generating a target contract and a terminal device. To alleviate or partially alleviate a dispute generated in a transaction on the Internet, a separate contract signing request to sign a contract with a second user cluster is generated based on an operation instruction of a first user. Then, the separate contract signing request is sent to a second terminal device cluster corresponding to the second user cluster, for M second terminal devices in the second terminal device cluster to each separately generate and return, based on the separate contract signing request, a piece of first acknowledgment information that acknowledges signing a contract. Based on M pieces of first acknowledgment information, chat information is determined from group chat records in a same chat group as the second user cluster, a pending contract is generated based on the chat information, and the pending contract is sent to the second terminal devices, for M second terminal devices in the second terminal device cluster to generate a piece of second acknowledgment information that acknowledges the pending contract; and based on the second acknowledgment information sent by each of the M second terminal devices, the pending contract is determined as a target contract separately agreed upon with each of the M second terminal devices. It can be understood that, in one or more implementations of the present specification, a contract is generated by using chat information in a network, so a contract can be concluded simply and quickly, so as to alleviate a transaction dispute between two parties due to lack of contract awareness or insufficient communication. Therefore, rights and obligations can be determined based on the contract, transaction disputes can be reduced, and a standard rights and obligations determining basis is provided for the transaction. In addition, uploading M target contracts to a blockchain can achieve a purpose of evidence storage.

In some embodiments, the following implementation describes a terminal device.

Figure 6:
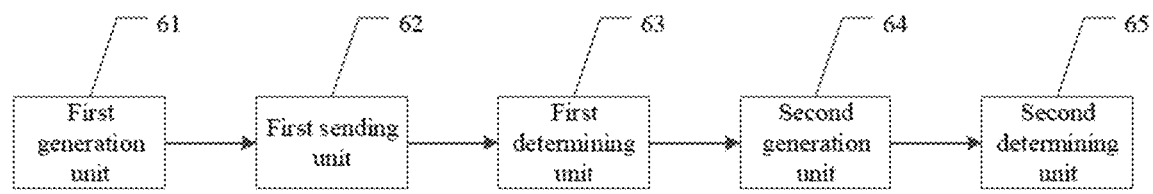
FIG. 6 is a schematic diagram illustrating a terminal device according to an implementation of the present specification.

Referring to FIG. 6, the terminal device includes: a first generation unit 61, configured to generate, based on an operation instruction of a first user, a separate contract signing request to separately sign a contract with each second user in a second user cluster; a first sending unit 62, configured to send the separate contract signing request to a second terminal device cluster corresponding to the second user cluster, a second user in the second user cluster being one-to-one corresponding to a second terminal device in the second terminal device cluster, for M second terminal devices in the second terminal device cluster to each separately generate and return, based on the separate contract signing request, a piece of first acknowledgment information that acknowledges signing a contract, M>0 and being a positive integer; a first determining unit 63, configured to determine, based on M pieces of first acknowledgment information, chat information from group chat records in a same chat group as the second user cluster; a second generation unit 64, configured to: generate a pending contract based on the chat information, and send the pending contract to the second terminal device cluster, so the M second terminal devices in the second terminal device cluster separately generate a piece of second acknowledgment information that acknowledges the pending contract; and a second determining unit 65, configured to: determine, based on the second acknowledgment information sent separately by the M second terminal devices, the pending contract as a target contract agreed upon with each of the M second terminal devices, and upload M target contracts to a blockchain.

In an optional implementation, the terminal device further includes: a determining unit, configured to determine whether a credit level of the first user reaches a predetermined credit level; a second sending unit, configured to: in response to the credit level of the first user reaching the predetermined credit level, sending the contract signing request to the second terminal device cluster; and a monitoring unit, configured to: in response to the credit level of the first user not reaching the predetermined credit level, generating one or more of first prompt information for displaying to the first user or second prompt information for sending to the second terminal device cluster.

In an optional implementation, the second sending unit is configured to separately send the separate contract signing request to respective second terminal devices.

In an optional implementation, the second generation unit 64 includes one or more of: a first adding unit, configured to directly add the chat information into the pending contract; or a second adding unit, configured to: perform word meaning recognition on the chat information, convert the chat information into text agreement information in a standard format, and add the text agreement information into the pending contract.

In an optional implementation, the second generation unit 64 includes: a receiving unit, configured to receive supplementary content from the first user; and a combination unit, configured to combine the chat information and the supplementary content from the first user into the pending contract.

In an optional implementation, the terminal device further includes: an acquisition unit, configured to separately perform, based on the pending contract, comment exchange with each second terminal device in the second terminal device cluster to obtain negotiation information for the second terminal device; and a third adding unit, configured to separately add the negotiation information for each second terminal device into a corresponding pending contract, as supplementary content of the corresponding pending contract for the second terminal device.

In an optional implementation, the terminal device further includes: an analysis unit, configured to analyze whether a logic expression of the pending contract is clear, e.g., meeting a clarity threshold, by using a machine learning model; an execution unit, configured to: in response to the logic expression of the pending contract being clear, e.g., meeting the clarity threshold, sending the pending contract to the second terminal device cluster; and a third generation unit, configured to: in response to the logic expression of the pending contract not being clear, e.g., not meeting a clarity threshold, generating prompt information indicating ambiguous information in the pending contract, so as to prompt the first user to process the ambiguous information; and receiving explanation information obtained after the first user processing the ambiguity information, and adding the explanation information into the pending contract.

In an optional implementation, the terminal device further includes: a downloading unit, configured to download the target contract from the blockchain.

Based on the same inventive concept as that in the above implementations, an implementation of the present specification further provides a computer readable storage medium on which a computer program is stored. The program is executed by a processor to implement the steps of any of the above methods.

Figure 7:
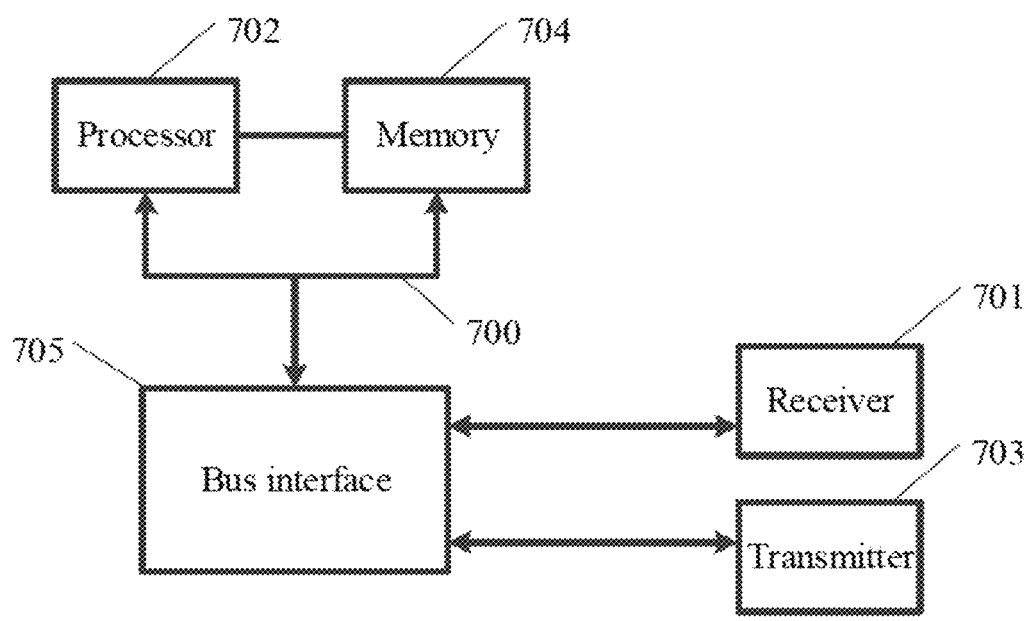
FIG. 7 is a schematic diagram illustrating a computer device according to an implementation of the present specification.

Based on the same inventive concept as that in the above implementations, an implementation of the present specification further provides a computer device. As shown in FIG. 7, the computer device includes a memory 704, a processor 702, and a computer program that is stored in the memory 704 and that can run on the processor 702, and the processor 702 implements the steps of any of the above methods when executing the program.

In FIG. 7, in a bus architecture (represented by a bus 700), the bus 700 can include any number of interconnected buses and bridges. The bus 700 links together various circuits of one or more processors represented by the processor 702 and a memory represented by the memory 704. The bus 700 can further link together various other circuits of a peripheral device, a voltage regulator, a power management circuit, etc., which are well-known in the art. Therefore, details are omitted here for simplicity in the present specification. A bus interface 705 provides an interface between the bus 700, a receiver 701, and a transmitter 703. The receiver 701 and the transmitter 703 can be the same element, that is, a transceiver, and provide units configured to communicate with various other terminal devices on a transmission medium. The processor 702 is responsible for managing the bus 700 and common processing, and the memory 704 can be configured to store data used when the processor 702 performs an operation.

With one or more implementations of the present specification, the present specification has the following beneficial effects or advantages:

One or more implementations of the present specification disclose a method for generating a target contract and a terminal device. To alleviate or partially alleviate a dispute generated in a transaction on the Internet, a joint contract signing request to sign a contract with a second user cluster is generated based on an operation instruction of a first user. Then, the joint contract signing request is sent to a second terminal device cluster corresponding to the second user cluster, for M second terminal devices in the second terminal device cluster to generate and return, based on the joint contract signing request, a piece of first acknowledgment information that acknowledges signing a contract. Based on M pieces of first acknowledgment information, chat information is determined from group chat records in a same chat group as the second user cluster, a pending contract is generated based on the chat information, and the pending contract is sent to the second terminal device, for P second terminal devices in the second terminal device cluster to generate a piece of second acknowledgment information that acknowledges the pending contract; and the pending contract is determined as the target contract based on P pieces of second acknowledgment information. It can be understood that, in one or more implementations of the present specification, a contract is generated by using chat information in a network, so a contract can be concluded simply and quickly, so as to alleviate a transaction dispute between two parties due to lack of contract awareness or insufficient communication. Therefore, rights and obligations can be determined based on the contract, transaction disputes can be reduced, and a standard rights and obligations determining basis is provided for the transaction. In addition, uploading the target contract to a blockchain can achieve a purpose of evidence storage.

The algorithm and display provided here are not inherently related to any particular computer, virtual system, or other devices. Various general-purpose systems can also be used together with the instruction based here. Based on the above description, the structure needed for constructing such a system is obvious. Furthermore, the present specification does not apply to any particular programming language. It should be understood that the content of the present specification described here can be implemented by using various programming languages, and the previous description of a detailed language is used to disclose the best implementation of the present specification.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical *Byzantine* fault tolerance (PBFT) consensus, described in further detail below.

Figure 8:
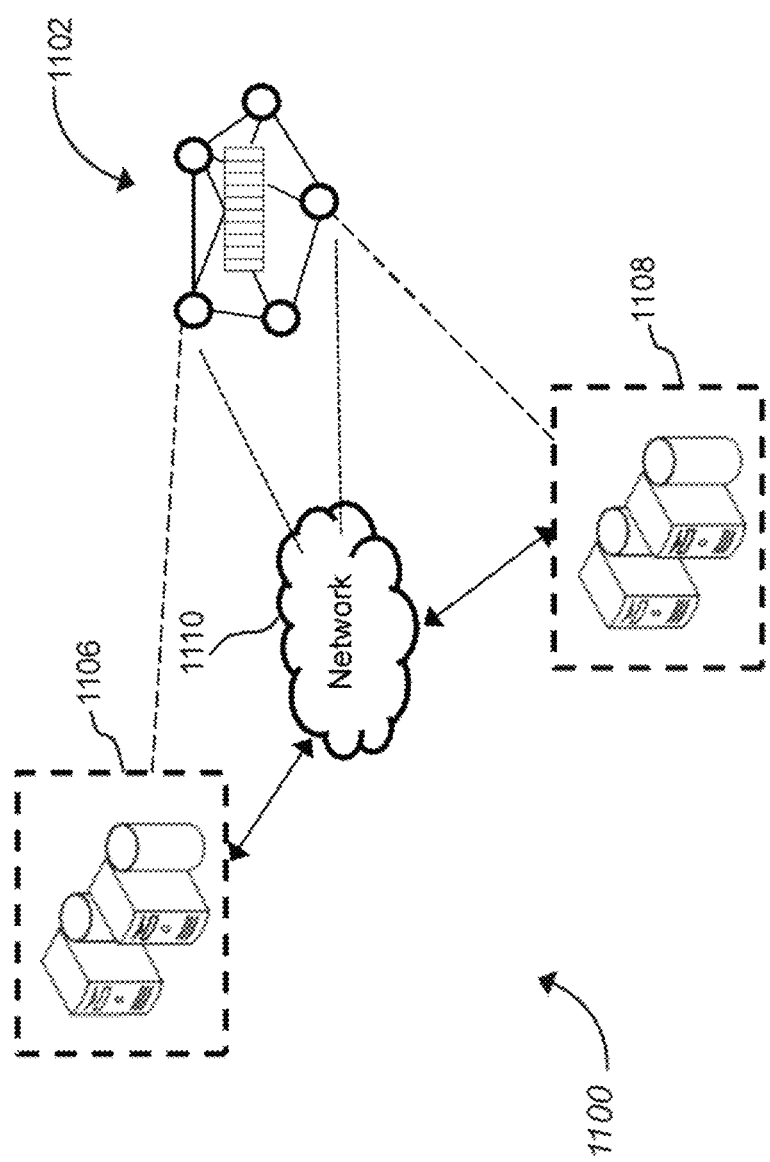
FIG. 8 is a diagram illustrating example environments that can be used to execute embodiments of this specification.

FIG. 8 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 8, the consortium blockchain network 1102 is represented as a peer-to-peer network of nodes, and the computing systems 1106, 1108 provide nodes of the first entity and second entity, respectively, which participate in the consortium blockchain network 1102.

Figure 9:
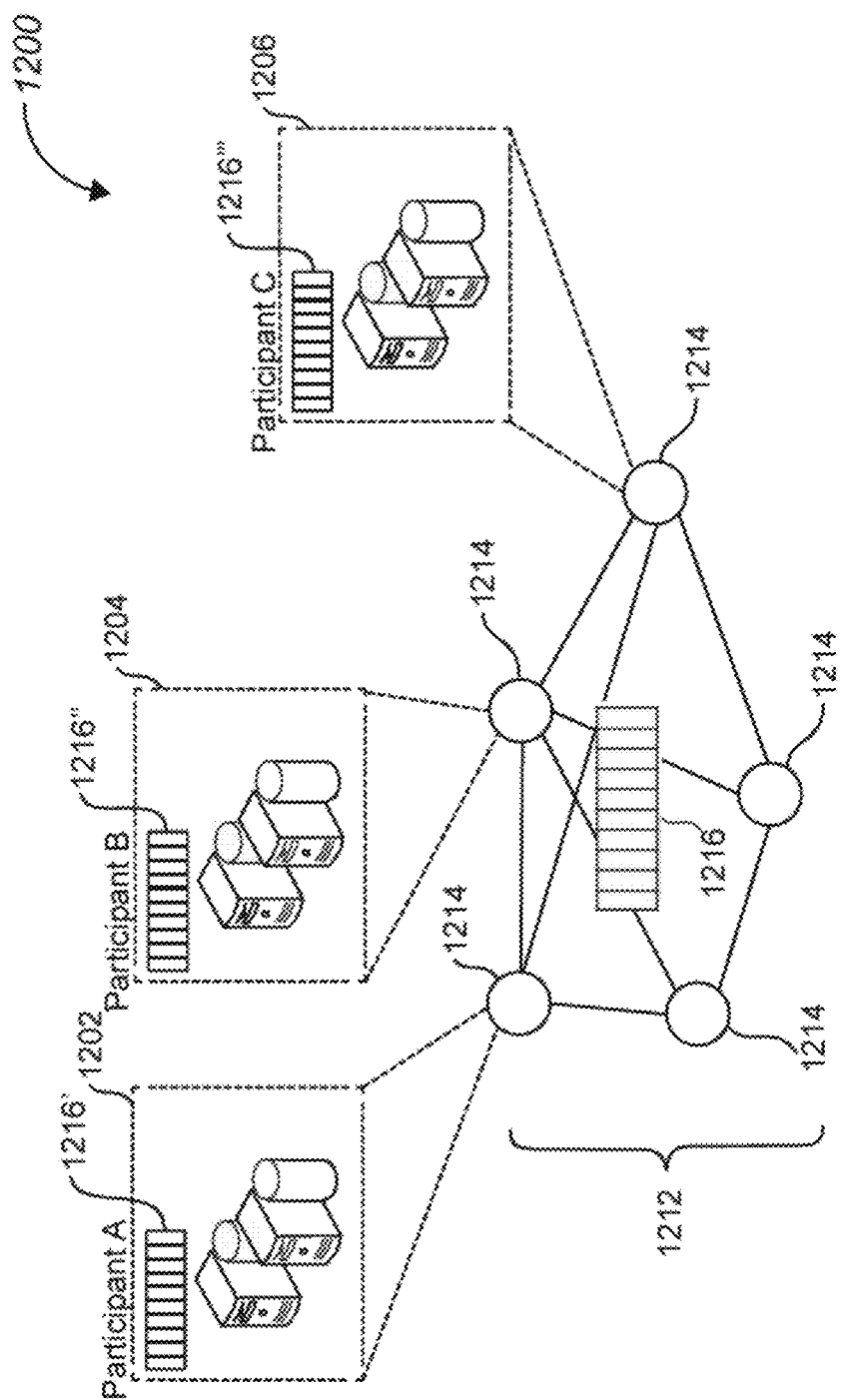
FIG. 9 is a diagram illustrating an example architecture in accordance with embodiments of this specification.

FIG. 9 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 9, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 9, the participant systems 1202, 1204 store respective, complete copies 1216', 1216'', 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 9, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical *Byzantine* state machine replication that tolerates *Byzantine* faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 9, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 9, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 8 and using the blockchain architecture 1200 of FIG. 9. For example, transaction information of a logistic process is stored as blocks in the blockchain 1216.

A large number of details are provided in the present specification. However, it can be understood that the implementations of the present specification can be practiced without these details. In some instances, well-known methods, structures, and technologies are not shown in detail, so as not to blur the understanding of the present specification.

Similarly, it should be understood that, to streamline the present disclosure and help understand one or more of various inventive aspects, the features of the present specification are sometimes grouped together into a single implementation, drawing, or description of the present specification. However, the disclosed method should not be interpreted as reflecting the following intention: That is, the claimed specification requires more features than the features specified in each claim. More accurately, as reflected in the claims below, the inventive aspects are less than all features of a single implementation previously disclosed. Therefore, the claims that follow a detailed implementation definitely incorporate the detailed implementation. Each claim serves as a separate implementation of the present specification.

A person skilled in the art can understand that modules in the devices in the implementations can be adaptively changed and disposed in one or more devices different from the implementations. Modules or units or components in the implementations can be combined into one module or unit or component, and can additionally be divided into a plurality of submodules or subunits or subcomponents. Except a fact that at least some of these features and/or processes or units are mutually exclusive, all disclosed features and all processes or units of any method or device that are disclosed in such a way in the present specification (including the appended claims, the abstract, and the accompanying drawings) can be combined in any combination mode. Unless otherwise explicitly stated, each feature disclosed in the present specification (including the appended claims, the abstract, and the accompanying drawings) can be replaced by an alternative feature that serves same, equivalent, or similar purposes.

In addition, a person skilled in the art can understand that, although some implementations described here include some features included in another implementation instead of including another feature, a combination of features of different implementations means falling within the scope of the present specification and forming different implementations. For example, in the following claims, any one of the contemplated implementations can be used in any combination mode.

Implementations of various parts in the present specification can be implemented by hardware, or software modules running on one or more processors, or a combination thereof. A person skilled in the art should understand that a microprocessor or a digital signal processor (DSP) can be used in practice to implement some or all of the functions of some or all of the components of the gateway, proxy server, or system based on an implementation of the present specification. The present specification can also be implemented as a device or terminal device program (e.g., computer program and computer program product) for executing a part or all of the methods described here. Such a program for implementing the present specification can be stored in a computer-readable medium, or can have a form of one or more signals. Such a signal can be downloaded from an Internet website, or provided on a carrier signal, or provided in any other form.

It should be noted that the previous implementations are intended for describing the present specification, instead of limiting the present specification, and a person skilled in the art can design an alternative implementation without departing from the scope of the appended claims. In the claims, any reference symbol located between brackets should not be constructed as a limitation on the claims. The word "include" does not exclude the existence of elements or steps not listed in the claims. The word "one" or "a/an" before the element does not exclude the presence of a plurality of such elements. The present specification can be implemented by hardware including several different elements and a computer that is appropriately programmed. In the unit claims enumerating several terminal devices, several of these terminal devices can be embodied by using the same hardware item. The use of words "first," "second," and "third" does not indicate any sequence. These words can be interpreted as names.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generating a target contract, comprising:
generating, at a first terminal device of a first user, a joint contract signing request to jointly sign a contract with a second user cluster;
sending the joint contract signing request to a second terminal device cluster corresponding to the second user cluster, a second user in the second user cluster being one-to-one corresponding to a second terminal device in the second terminal device cluster, for M second terminal devices in the second terminal device cluster to each generate and return, based on the joint contract signing request, a piece of first acknowledgment information that acknowledges jointly signing the contract, M>0 and being a positive integer;
participating in a chat group designated for generating a pending contract, the chat group including the first user and second users in the second user cluster;
determining, based on M pieces of first acknowledgment information, chat information from group chat records in the chat group;
expediting contract conclusion by generating a content of the pending contract including a term of the pending contract by automatically extracting the content from the chat information and directly inserting the content into the pending contract without further processing the content, and sending the pending contract to the second terminal device cluster, for P second terminal devices in the second terminal device cluster to each generate a piece of second acknowledgment information that acknowledges the pending contract, P>0 and being a positive integer;
determining the pending contract as the target contract in response to the P second terminal devices in the second terminal device cluster having generated P pieces of second acknowledgment information; and
uploading the target contract and the chat information to a blockchain with the target contract and the chat information corresponding to one another in the blockchain.

2. The method according to claim 1, further comprising:
before the sending the joint contract signing request to the second terminal device cluster corresponding to the second user cluster:
determining whether a credit level of the first user reaches a predetermined credit level;
in response to the credit level of the first user reaching the predetermined credit level, sending the joint contract signing request to the second terminal device cluster; and
in response to the credit level of the first user not reaching the predetermined credit level, generating one or more of first prompt information for displaying to the first user or second prompt information for sending to the second terminal device cluster.

3. The method according to claim 1, wherein the generating the content of the pending contract further includes:
performing word meaning recognition on the chat information, converting the chat information into text agreement information in a standard format, and adding the text agreement information into the pending contract.

4. The method according to claim 1, comprising:
receiving supplementary content from the first user; and
combining the chat information and the supplementary content from the first user into the pending contract.

5. The method according to claim 1, further comprising:
after the generating the content of the pending contract, and the sending the pending contract to the second terminal device cluster:
performing one or more times of comment exchange with the second terminal device cluster based on the pending contract to obtain negotiation information corresponding to the pending contract; and
adding the negotiation information into the pending contract as supplementary content of the corresponding pending contract.

6. The method according to claim 1, further comprising:
after the generating the content of the pending contract:
analyzing whether a logic expression of the pending contract meets a clarity threshold by using a machine learning model;
in response to the logic expression of the pending contract meeting the clarity threshold, sending the pending contract to the second terminal device cluster; and
in response to the logic expression of the pending contract not meeting the clarity threshold, generating prompt information indicating ambiguous information in the pending contract, so as to prompt the first user to process the ambiguous information; and receiving explanation information obtained after the first user processing the ambiguity information, and adding the explanation information into the pending contract.

7. The method according to claim 1, further comprising:
after the uploading the target contract to the blockchain:
downloading the target contract from the blockchain.

8. A method for generating a target contract, comprising:
generating, at a first terminal device of a first user, a separate contract signing request to separately sign a contract with each second user in a second user cluster;
sending the separate contract signing request to a second terminal device cluster corresponding to the second user cluster, a second user in the second user cluster being one-to-one corresponding to a second terminal device in the second terminal device cluster, for M second terminal devices in the second terminal device cluster to each separately generate and return, based on the separate contract signing request, a piece of first acknowledgment information that acknowledges signing the contract, M>0 and being a positive integer;
participating in a chat group designated for generating a pending contract, the chat group including the first user and second users in the second user cluster;
determining, based on M pieces of first acknowledgment information, chat information from group chat records in the chat group;
expediting contract conclusion by generating a content of the pending contract including a term of the pending contract by automatically extracting the content from the chat information and directly inserting the content into the pending contract without further processing the content, and sending the pending contract to the second terminal device cluster, for the M second terminal devices in the second terminal device cluster to each separately generate a piece of second acknowledgment information that acknowledges the pending contract;
determining, in response to the M second terminal devices in the second terminal device cluster having separately sent the second acknowledgment information, the pending contract as a target contract agreed upon with each of the M second terminal devices; and
uploading M target contracts and the chat information to a blockchain with the M target contracts each corresponding to the chat information in the blockchain.

9. The method according to claim 8, further comprising:
before the sending the separate contract signing request to the second terminal device cluster corresponding to the second user cluster:
determining whether a credit level of the first user reaches a predetermined credit level;
in response to that the credit level of the first user reaches the predetermined credit level, sending the separate contract signing request to the second terminal device cluster; and
in response to that the credit level of the first user does not reach the predetermined credit level, generating one or more of first prompt information for displaying to the first user or second prompt information for sending to the second terminal device cluster.

10. The method according to claim 8, wherein the sending the separate contract signing request to the second terminal device cluster corresponding to the second user cluster includes:
separately sending the separate contract signing request to respective second terminal devices.

11. The method according to claim 8, wherein the generating the content of the pending contract further includes:
performing word meaning recognition on the chat information, converting the chat information into text agreement information in a standard format, and adding the text agreement information into the pending contract.

12. The method according to claim 8, comprising:
receiving supplementary content from the first user; and
combining the chat information and the supplementary content from the first user into the pending contract.

13. The method according to claim 8, further comprising:
after the generating the content of the pending contract, and the sending the pending contract to the second terminal device cluster:
separately performing, based on the pending contract, comment exchange with each second terminal device in the second terminal device cluster to obtain negotiation information for the second terminal device; and
separately adding the negotiation information for each second terminal device into a corresponding pending contract, as supplementary content of the corresponding pending contract for the second terminal device.

14. The method according to claim 8, further comprising:
after the generating the content of the pending contract:
analyzing whether a logic expression of the pending contract meets a clarity threshold by using a machine learning model;
in response to that the logic expression of the pending contract meets the clarity threshold, sending the pending contract to the second terminal device cluster; and in response to the logic expression of the pending contract not meeting the clarity threshold, generating prompt information indicating ambiguous information in the pending contract, so as to prompt the first user to process the ambiguous information; and receiving explanation information obtained after the first user processing the ambiguous information, and adding the explanation information into the pending contract.

15. The method according to claim 8, further comprising: after the uploading the target contract to the blockchain:
    downloading the target contract from the blockchain.

16. A non-transitory computer readable storage medium on which a computer program is stored, which when executed by a processor enables the processor to implement acts comprising:
    generating, at a first terminal device of a first user, a joint contract signing request to jointly sign a contract with a second user cluster;
    sending the joint contract signing request to a second terminal device cluster corresponding to the second user cluster, a second user in the second user cluster being one-to-one corresponding to a second terminal device in the second terminal device cluster, for M second terminal devices in the second terminal device cluster to each generate and return, based on the joint contract signing request, a piece of first acknowledgment information that acknowledges jointly signing the contract, M>0 and being a positive integer;
    participating in a chat group designated for generating, a pending contract, the chat group including the first user and second users in the second user cluster;
    determining, based on M pieces of first acknowledgment information, chat information from group chat records in the chat group;
    expediting contract conclusion by generating a content of the pending contract including a term of the pending contract by automatically extracting the content from the chat information and directly inserting the content into the pending contract without further processing the content, and sending the pending contract to the second terminal device cluster, for P second terminal devices in the second terminal device cluster to each generate a piece of second acknowledgment information that acknowledges the pending contract, P>0 and being a positive integer;
    determining the pending contract as a target contract in response to the P second terminal devices in the second terminal device cluster having generated P pieces of second acknowledgment information; and
    uploading the target contract and the chat information to a blockchain with the target contract and the chat information corresponding to one another in the blockchain.

17. The non-transitory computer readable storage medium according to claim 16, wherein the acts comprise:
    before the sending the joint contract signing request to the second terminal device cluster corresponding to the second user cluster:
        determining whether a credit level of the first user reaches a predetermined credit level;
        in response to the credit level of the first user reaching the predetermined credit level, sending the joint contract signing request to the second terminal device cluster; and
        in response to the credit level of the first user not reaching the predetermined credit level, generating one or more of first prompt information for displaying to the first user or second prompt information for sending to the second terminal device cluster.

18. The non-transitory computer readable storage medium according to claim 16, wherein the generating the content of the pending contract includes:
    performing word meaning recognition on the chat information, converting the chat information into text agreement information in a standard format, and adding the text agreement information into the pending contract.

19. A computing device, comprising a memory, a processor, and a computer program that is stored in the memory and that can run on the processor, when executing the program the processor implementing acts comprising:
    generating, at a first terminal device of a first user, a separate contract signing request to separately sign a contract with each second user in a second user cluster;
    sending the separate contract signing request to a second terminal device cluster corresponding to the second user cluster, a second user in the second user cluster being one-to-one corresponding to a second terminal device in the second terminal device cluster, for M second terminal devices in the second terminal device cluster to each separately generate and return, based on the separate contract signing request, a piece of first acknowledgment information that acknowledges signing the contract, M>0 and being a positive integer;
    participating in a chat group designated for generating a pending contract, the chat group including the first user and second users in the second user cluster;
    determining, based on M pieces of first acknowledgment information, chat information from group chat records in the chat group;
    expediting contract conclusion by generating a content of the pending contract including a term of the pending contract by automatically extracting the content from the chat information and directly inserting the content into the pending contract without further processing the content, and sending the pending contract to the second terminal device cluster, for the M second terminal devices in the second terminal device cluster to each separately generate a piece of second acknowledgment information that acknowledges the pending contract;
    determining, in response to the M second terminal devices in the second terminal device cluster having separately sent the second acknowledgment information, the pending contract as a target contract agreed upon with each of the M second terminal devices; and
    uploading M target contracts and the chat information to a blockchain with the M target contracts each corresponding to the chat information in the blockchain.

20. The computing device according to claim 19, wherein the acts include:
    receiving supplementary content from the first user; and
    combining the chat information and the supplementary content from the first user into the pending contract.

21. The computing device according to claim 19, wherein the acts comprise:
    after the generating the content of the pending contract based on the chat information, and the sending the pending contract to the second terminal device cluster:
        separately performing, based on the pending contract, comment exchange with each second terminal device in the second terminal device cluster to obtain negotiation information for the second terminal device; and separately adding the negotiation information for each second terminal device into a corresponding pending contract, as supplementary content of the corresponding pending contract for the second terminal device.

22. The computing device according to claim 19, wherein the acts comprise:
after the generating the content of the pending contract based on the chat information:
analyzing whether a logic expression of the pending contract meets a clarity threshold by using a machine learning model;
in response to that, the logic expression of the pending contract meets the clarity threshold, sending the pending contract to the second terminal device cluster; and
in response to the logic expression of the pending contract not meeting the clarity threshold, generating prompt information indicating ambiguous information in the pending contract, so as to prompt the first user to process the ambiguous information; and receiving explanation information obtained after the first user has processed the ambiguous information, and added the explanation information into the pending contract.

* * * * *